(12) United States Patent
Fjermestad et al.

(10) Patent No.: US 11,854,037 B2
(45) Date of Patent: *Dec. 26, 2023

(54) COMPUTER SYSTEM FOR IDENTIFYING ABERRANT ACTIVITY ON A REWARD CARD PLATFORM

(71) Applicant: Tango Card, Inc., Seattle, WA (US)

(72) Inventors: Jacob T. Fjermestad, Boise, ID (US);
Dariush B. Houle, Boise, ID (US);
Shoni J. Blue, Seattle, WA (US); Chek T. Lim, Bellevue, WA (US)

(73) Assignee: Tango Card, Inc., Seattle, WA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/534,439

(22) Filed: Nov. 23, 2021

(65) Prior Publication Data

US 2022/0084059 A1 Mar. 17, 2022

Related U.S. Application Data

(63) Continuation of application No. 15/480,296, filed on Apr. 5, 2017, now Pat. No. 11,182,818, which is a
(Continued)

(51) Int. Cl.
*G06Q 30/00* (2023.01)
*G06Q 30/0207* (2023.01)
(Continued)

(52) U.S. Cl.
CPC ......... *G06Q 30/0225* (2013.01); *G06N 20/00* (2019.01); *G06Q 20/354* (2013.01); *G06F 3/0482* (2013.01); *G06F 3/04847* (2013.01)

(58) Field of Classification Search
CPC .............. G06Q 30/0225; G06Q 20/354; G06F 3/0482; G06F 3/04847
See application file for complete search history.

(56) References Cited

U.S. PATENT DOCUMENTS 10,565,642 B1 2/2020 Cieri et al.
2002/0077973 A1 6/2002 Ronchi et al.
(Continued)

OTHER PUBLICATIONS

H.-H. Lin, C.-H. Mao and H.-M. Lee, "False Alarm Reduction by Weighted Score-Based Rule Adaptation through Expert Feedback," 2009 2nd International Conference on Computer Science and its Applications, Jeju, Korea (South), 2009, pp. 1-8, doi: 10.1109/CSA.2009.5404244 (Year: 2009).*

(Continued)

*Primary Examiner* — Sun M Li
(74) *Attorney, Agent, or Firm* — Morgan, Lewis & Bockius LLP

(57) ABSTRACT

A reward card platform includes a database storing funding accounts, reward card purchase transactions, and aberrant activity rules. A first user interface enables purchasing reward cards, including controls to specify reward card parameters. A second user interface enables specifying rules to detect aberrant activity. The second user interface includes user interface controls to specify the rule parameters, including: specifying a moving window of time; specifying an aggregation type; specifying filtering; specifying aggregation grouping; and specifying a threshold value for triggering an alert. The platform includes a rules execution engine that runs periodically to evaluate each of the rules. For each rule, the engine identifies transactions whose timestamps fall within the moving window of time relative to a current time and satisfies the filters, then computes an aggregation of the transactions according to the aggregation type and aggregation grouping. When the aggregation exceeds the threshold value, the platform raises an alert.

20 Claims, 12 Drawing Sheets

Related U.S. Application Data continuation of application No. 15/469,293, filed on Mar. 24, 2017, now abandoned.

(51) Int. Cl.
*G06Q 20/34* (2012.01)
*G06N 20/00* (2019.01)
*G06F 3/04847* (2022.01)
*G06F 3/0482* (2013.01)

(56) References Cited

U.S. PATENT DOCUMENTS

| | | | | |
|---|---|---|---|---|
| 2008/0275916 | A1* | 11/2008 | Bohannon | G06Q 10/06 |
| 2008/0301019 | A1* | 12/2008 | Monk | G06Q 20/4016 |
| | | | | 705/35 |
| 2009/0244285 | A1 | 10/2009 | Chathukutty et al. | |
| 2010/0287099 | A1* | 11/2010 | Liu | G06Q 20/40 |
| | | | | 235/380 |
| 2011/0054935 | A1 | 3/2011 | Hardaway | |
| 2014/0229383 | A1* | 8/2014 | Wolfe | G06Q 20/354 |
| | | | | 705/44 |
| 2015/0066738 | A1* | 3/2015 | Tian | G06Q 40/03 |
| | | | | 705/38 |
| 2016/0012465 | A1 | 1/2016 | Sharp | |

OTHER PUBLICATIONS

A data mining approach using transaction patterns for card fraud detection☆ Chae Chang Lee, Ji Won Yoon, arXiv:1306.5547v1 [cs.CR] Jun. 24, 2013 (Year: 2013).*

T. Allan and J. Zhan, "Towards Fraud Detection Methodologies," 2010 5th International Conference on Future Information Technology, Busan, Korea (South), 2010, pp. 1-6, doi: 10.1109/FUTURETECH.2010.5482631. (Year: 2010).*

A data mining approach using transaction patterns for card fraud detection by Chae Chang Lee, Ji Won Yoon, arXiv:1306.5547v1, Jun. 24, 2013, p. 1-12 (Year: 2013).*

M. R. HaratiNik, M. Akrami, S. Khadivi and M. Shajari, "FUZZGY: A hybrid model for credit card fraud detection," 6th International Symposium on Telecommunications (IST), Tehran, Iran, 2012, pp. 1088-1093, doi: 10.1109/ISTEL.2012.6483148. (Year: 2012).*

Hassan Masum; Mark Tovey; Craig Newmark, "Web Reputation Systems and the Real World," in The Reputation Society: How Online Opinions Are Reshaping the Offline World , MIT Press, 2011, pp. 13-24. (Year: 2011).

Cryptography and Security (cs.CR); Operating Systems (cs.OS), ACM classes: D.4.6, Submitted on Feb. 1, 2010] Cite as: arXiv: 1002.0298 [cs.CR], (or arXiv: 1002.0298v1 [cs.CR] for this version) https://doi .org/10.48550/arXiv.1002.0298 (Year: 2010).

Cyclic Consumption and Replenishment Decisions for Vendor-Managed Inventory of Multisourced Parts in Dell's Supply Chain Abhilasha Prakash Katariya, Si la cetinkaya, Eylem Tekin Published Online:Jun. 4, 2014 https://doi.org/10.1287/inte.2014.0745 (Year: 2014), 18 pgs.

J. Robert, S. Kubler and Y. Le Traon, "Micro-billing Framework for IoT: Research & Technological Foundations," 2016 IEEE 4th International Conference on Future Internet of Things and Cloud (FiCloud), Vienna, Austria, 2016, pp. 301-308, doi: 10.1109/ FiCloud.2016.50. (Year: 2016), 8 pgs.

L. Shastri, S. Narasimhamurthy and D. P. Muni, "A novel rewards-based protocol and decision-making technique for transshipment in supply chains," 2010 IEEE International Conference on Industrial Engineering and Engineering Management, Macao, China, 2010, pp. 1133-1138, doi: 10.1109/IEEM.2010.5674322. (Year: 2010).

\* cited by examiner

Reward Card Transaction Table 114

| Account No. | Beneficiary Email Address | Transaction Timestamp | Card Denomination | Card Brand |
|---|---|---|---|---|
| 2350012 | employee12 @sample... | 2018-01-12 07:15:22 | $100.00 | Company X |
| 2350012 | employee37 @sample... | 2018-01-12 07:17:24 | $200.00 | Company Y |
| ... | ... | ... | ... | ... |

Figure 6A

Aberrant Activity Detection Rules 124 (and Rule Parameters 126)

| Time Window Duration | Aggregation Type | Filters | Aggregation Grouping | Threshold | Action |
|---|---|---|---|---|---|
| 1 hour | Transaction Count | Retail Apparel Brands | Beneficiary Email Address | 50 Transactions | Email Alert |
| 30 minutes | Card Face Value Total | None | None | $2,000 | Email Alert |
| 15 minutes | Card Face Value Total | None | None | $2,000 | Pager Alert |
| ... | ... | ... | ... | ... | ... |

Figure 6B

Funding Account Table 104

| Account No. | Company | Status | Balance |
|---|---|---|---|
| 2350012 | Sample Company | Active | 20,500 |
| 1479388 | Large Company | Inactive | 10 |
| 1972104 | Alpha Company | Suspended | 12,400 |

642 → Account No.  644 → Company  646 → Status  648 → Balance  650 → (row)

Figure 6C

Funding Transaction Table 344

| Account No. | Funding Source | Funding Type | Amount | Timestamp |
|---|---|---|---|---|
| 2350012 | Source Bank 1 | Wire | 10,000 | 2018-01-02 08:52:55 |
| 2350012 | Source Bank 2 | ACH | 12,000 | 2018-01-02 08:55:23 |
| 1972104 | VISA | Credit Card | 2,500 | 2018-01-08 14:20:02 |

662 → Account No.  664 → Funding Source  666 → Funding Type  668 → Amount  670 → Timestamp

Figure 6D

COMPUTER SYSTEM FOR IDENTIFYING ABERRANT ACTIVITY ON A REWARD CARD PLATFORM

RELATED APPLICATIONS

This application is a continuation of U.S. patent application Ser. No. 15/480,296, filed Apr. 5, 2017, entitled "Computer System for Identifying Aberrant Activity on a Reward Card Platform," which is a continuation of U.S. patent application Ser. No. 15/469,293, filed Mar. 24, 2017, entitled "Computer System for Identifying Aberrant Activity on a Reward Card Platform," each of which is incorporated by reference herein in its entirety.

TECHNICAL FIELD

The disclosed implementations relate generally to reward cards and more specifically to systems, methods, and user interfaces that identify aberrant activity in the purchasing of reward cards.

BACKGROUND

Use of stored-value instruments has increased dramatically in recent years. Consumers purchase or otherwise obtain stored-value instruments, often in the form of gift cards, and use a monetary value associated with these instruments to purchase goods or services at corresponding merchants. Historically, gift cards provide a restricted monetary equivalent or scrip that is issued by retailers or banks as an alternative to a non-monetary gift.

A gift card is also referred to as a reward card, particularly in the context of a business providing reward cards to its employees or customers. Businesses purchase reward cards to create or strengthen a personal, social, or business relationship with the beneficiaries. In this context, a single benefactor (e.g., a business) may purchase a large number of reward cards, and may purchase a wide variety of reward cards. To facilitate this, a reward card platform may provide a single infrastructure for benefactors to purchase all of the reward cards desired.

A reward card platform includes funding accounts, which simplifies the process of purchasing individual reward cards. For example, a company can fund its account with $5000 as a single funding transaction, then purchase many $50 reward cards for its employees. However, because the reward card platform is provided over the Internet, it is subject to potential abuse by parties who would like to access the money in the funding accounts.

SUMMARY

The present disclosure describes features of a reward card platform that identify aberrant activity in reward card funding accounts. Here, the aberrant activity involves the funding of reward cards, and not how reward cards are later used by the beneficiaries. In addition, aberrant activity in a funding account is typically identified in the aggregate. For example, when a total dollar amount or total number of cards exceeds a threshold value in a certain window of time, the reward card platform raises an alert of the aberrant activity.

In accordance with some implementations, a computer system implements a reward card platform. The reward card platform includes a database that stores funding accounts, reward card purchase transactions, aberrant activity rules, and reward card purchase options. The reward card platform provides a first user interface for purchasing reward cards, including user interface controls to specify a funding account, to specify a reward brand according to the stored reward card purchase options, to specify a reward card denomination according to the stored reward card purchase options, to specify an email address for a reward card recipient, and to commit a reward card purchase transaction. The reward card platform also includes a second user interface, which enables users to specify rules for detecting aberrant activity associated with purchasing reward cards. The second user interface includes a list of aberrant activity rules and user interface controls to add new aberrant activity rules, delete stored aberrant activity rules, and create new aberrant activity rules. Each aberrant activity rule includes a plurality of rule parameters and the controls to create new aberrant activity rules specify the rule parameters.

The second user interface includes a first control to specify a moving window of time, a second control to specify an aggregation type that is either a transaction count or a sum of monetary value, one or more third controls to specify filtering by one or more reward card brands or one or more reward card denominations, one or more fourth controls to specify aggregation grouping, and a fifth control to specify a threshold value for triggering an alert.

The reward card platform also includes a rules execution engine that runs periodically to evaluate each of the aberrant activity rules stored in the database. For each aberrant activity rule, the rules engine: (i) identifies stored reward card purchase transactions whose timestamps fall within the respective moving window of time relative to a current time and whose reward card brand and reward card denomination match the respective rule parameters that specify filtering; (ii) computes a respective aggregation of the identified reward card purchase transactions according to the respective aggregation type and aggregation grouping; and (iii) upon determining that the respective aggregation exceeds the respective threshold value, raising an alert of aberrant activity.

In some implementations, the respective aggregation grouping is based on one or more of: reward card brand, reward card denomination, and beneficiary email address. The rules execution engine computes a plurality of aggregations according to the respective aggregation grouping, and each of the plurality of aggregations is independently compared to the respective threshold value. The rules engine raises a respective aberrant activity alert for each of the plurality of aggregations that exceeds the respective threshold value.

In some implementations, the database stores, for each reward card purchase transaction, (i) a funding account, (ii) a beneficiary email address, (iii) a timestamp indicating a time when the transaction occurred, (iv) a reward card denomination, and (v) a reward card brand.

In some implementations, raising the alert of aberrant activity includes sending an email alert, sending a pager alert, and/or taking an action that immediately affects usage of the corresponding funding account. In some implementations, the action taken on the funding account deactivates the funding account. In some implementations, the action taken on the funding account places the funding account in an investigation status. In some implementations, a funding account in investigation status limits the activity on the account. In some implementations, the imposed limit on activity precludes any activity at all. In some implementations, a funding account in investigation status has an upper limit on the number or monetary value of reward cards that can be issued on the funding account. The upper limit may be specified either as an absolute amount (i.e., a limit on the total number or monetary value of reward cards while the funding account is in investigation status) or as a limit per unit of time (e.g., per hour). In some implementations, the magnitude of the imposed limit depends on the data triggering the alert. For example, when the aggregated data that triggers the alert exceeds the threshold by a large amount, the imposed limit many be small. When the aggregated data exceeds the threshold by a small amount, the imposed limit may be higher. In some implementations, these limits are imposed in real-time, so attempts to issue reward cards that would exceed the limit are prevented.

An alert that triggers investigation status can have other effects as well. For example, in some implementations, an alert can adjust one or more rule parameters for one or more of the rules (e.g., reduce a threshold value). As another example, a funding account in investigation status may require an additional approval (e.g., from an additional person) in order to issue new reward cards. In some implementations, when a funding account is in investigation status, the set of authorized users for the funding account may be restricted. In some implementations, when an alert is triggered based on excess reward cards to a specific email address (or domain or group of email addresses), the alert sets up a block on the problematic email address, domain, or group of email addresses.

In some implementations, a first aberrant activity rule includes a plurality of threshold values, where each threshold value has a corresponding distinct aberrant activity alert. Evaluating the first aberrant activity rule includes comparing the respective aggregation to each of the plurality of threshold values. Upon determining that the respective aggregation exceeds a respective one of the threshold values, the respective corresponding aberrant activity alert is raised.

In some implementations, at least one of the aberrant activity rules is based on supervised machine learning of reward card purchase transactions stored in the database.

In some implementations, after raising an aberrant activity alert based on a first aberrant activity rule, the reward card platform provides a third user interface for use by a person who reviews the identified activity. In some instances, the person provides user input in the third user interface indicating the reward card transactions associated with the aberrant activity alert are not a problem. In some implementations, the reward card platform automatically adjusts the threshold value corresponding to the first aberrant activity rule.

In some implementations, a non-transitory computer readable storage medium stores one or more programs configured for execution by a computer system having one or more processors, memory, and a display. The one or more programs include instructions for implementing any of the computer systems described herein.

In accordance with some implementations, a method executes at a computer system having a display, one or more processors, and memory storing one or more programs configured for execution by the one or more processors, thereby implementing any of the computer systems described herein.

Thus methods, systems, and graphical user interfaces are disclosed that provide a reward card platform, and detect aberrant activity on the platform.

BRIEF DESCRIPTION OF THE DRAWINGS

For a better understanding of the aforementioned systems, methods, and graphical user interfaces, as well as additional systems, methods, and graphical user interfaces that provide a reward card platform, reference should be made to the Description of Implementations below, in conjunction with the following drawings in which like reference numerals refer to corresponding parts throughout the figures.

FIGS. 6A-6D are skeletal data structures that store data used to identify aberrant activity in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
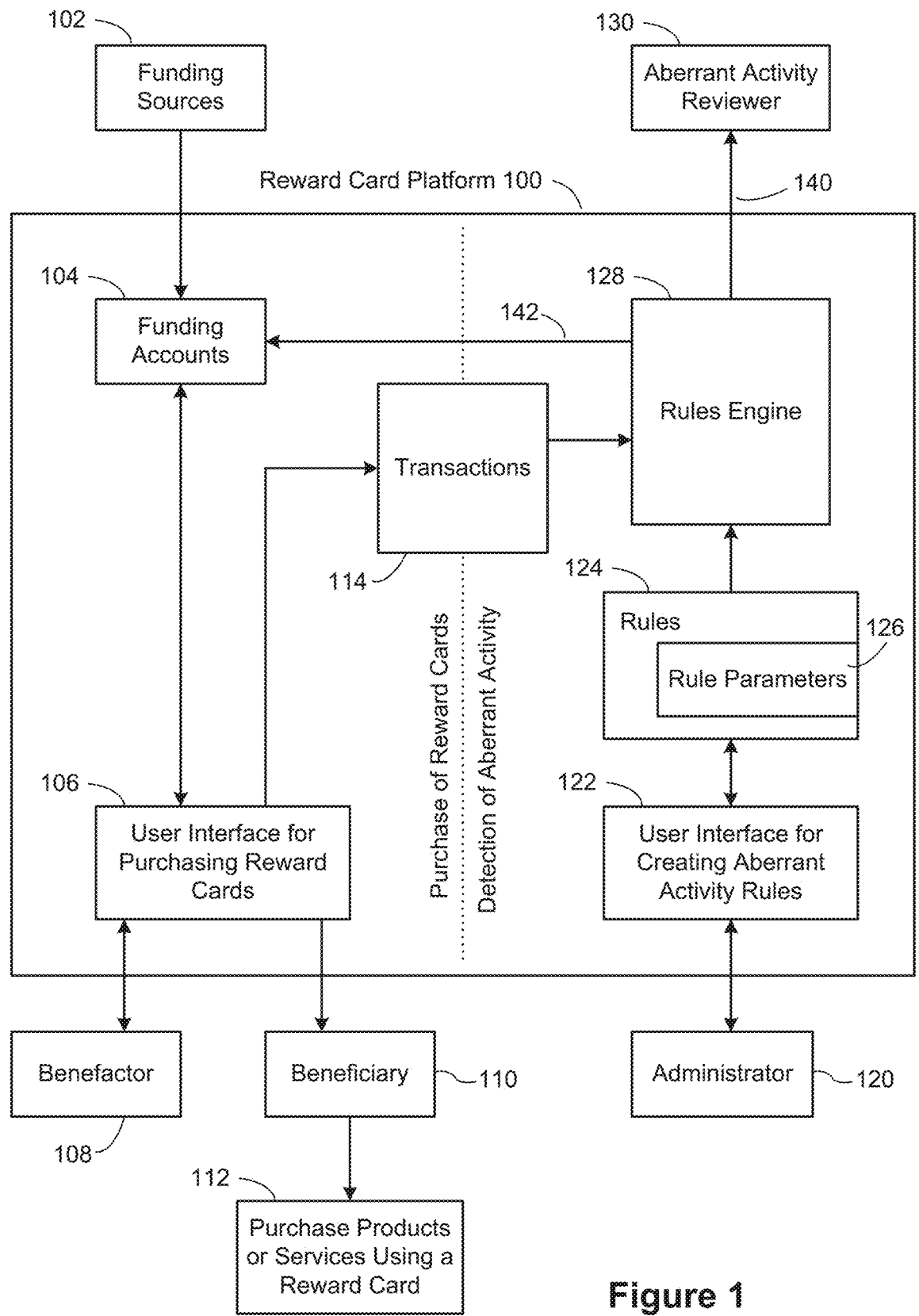
FIG. 1 illustrates some elements of a reward card platform and a context in which it is used in accordance with some implementations.

FIG. 1 illustrates some elements of a reward card platform 100 and a context in which it is used in accordance with some implementations. On the left-hand side of the reward card platform 100 in FIG. 1 are the elements involved in purchasing reward cards. On the right-hand side are the elements used in detecting aberrant activity related to those purchases. In the middle are the purchase transactions 114, which is a table that tracks those purchases. The transaction table 114 is described in more detail below in FIG. 6A. Note that the transactions in the transaction table 114 represent purchasing reward cards, not the subsequent use of a reward card by a beneficiary 110 to purchase (112) products and services using a reward card.

Reward cards are purchased using money in a funding account 104. The structure of the funding accounts 104 is described in more detail below in FIG. 6C. As illustrated in FIG. 1, the funds in the funding account can come from a variety of funding sources 102. For example, a funding account can be funded through wire transfer, ACH, a credit or debit card, or other electronic transfer processes. Some implementations also allow for funds deposited by check. In some instances, a benefactor 108 maintains a non-zero balance in a funding account 104. In some instances, a benefactor 108 transfers funds into a funding account immediately prior to a reward card campaign so that funds are in the funding account 104 for a short window of time. In some implementations, each funding event has an associated funding transaction stored in a funding transaction table 344, as illustrated in FIG. 6D. In some implementations, the reward card platform 100 provides a user interface for initiating funds transfers into funding accounts 104.

Figure 4:
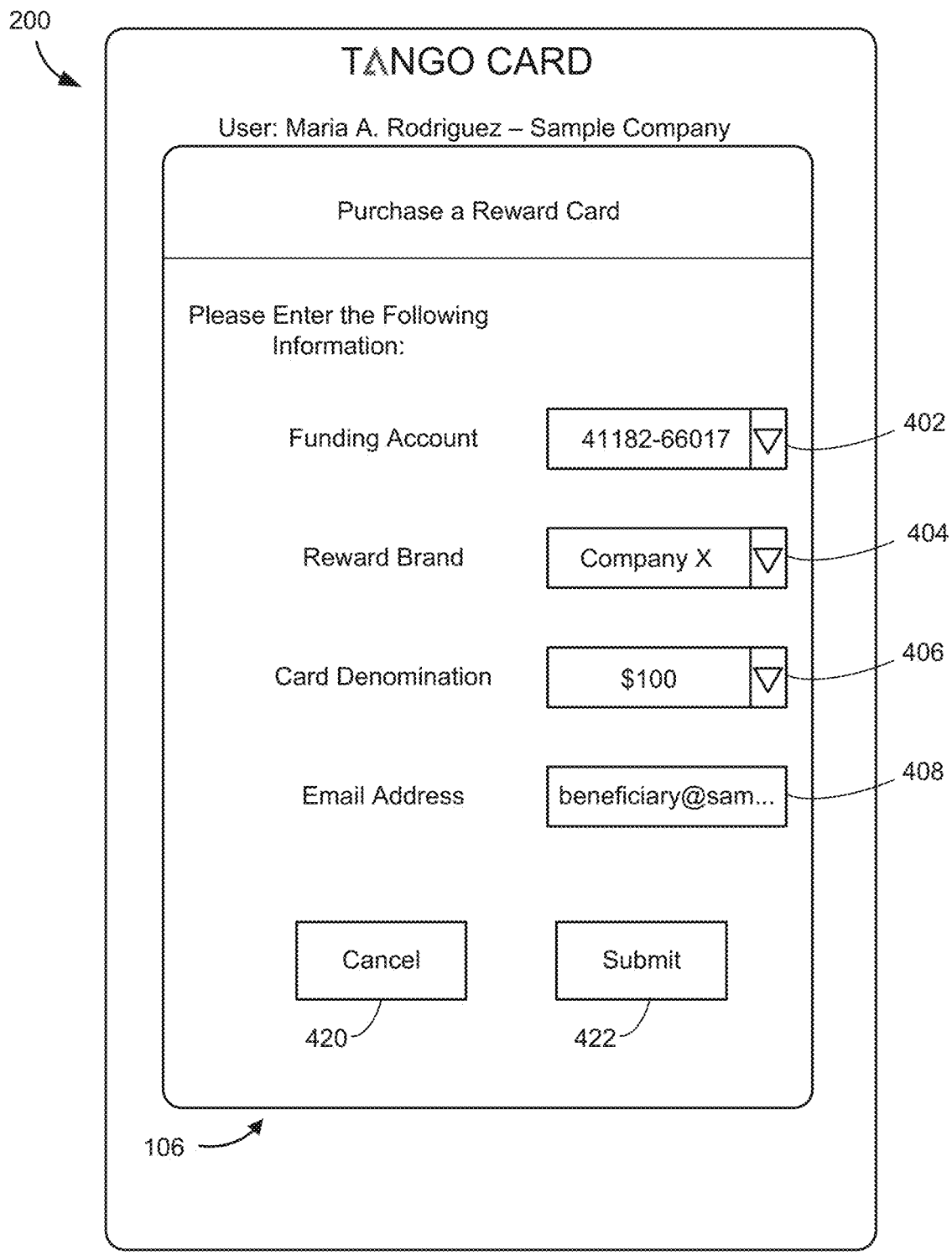
FIG. 4 is a simplified example of a user interface for purchasing reward cards in accordance with some implementations.

The reward card platform 100 provides a user interface 106 for purchasing reward cards, which may be implemented as a web application (e.g., in the cloud) or as a downloaded application that runs locally on a client device 200 of the benefactor 108. A simplified example of a purchasing interface is illustrated in FIG. 4. The benefactor 108 interacts with the purchasing user interface 106 to specify what cards are being purchased (e.g., brand and monetary amount) as well as who is receiving the reward card (e.g., using an email address or cell phone number). In some implementations, the benefactor 108 can specify a list of beneficiaries 110 at one time rather than going through the process one-by-one. In some implementations, the reward card platform 100 provides an application user interface (API) so that an external system (such as an enterprise HR system) can purchase reward cards as a batch and initiate the purchase from the external system (e.g., using a web service).

After the transactions are created, the rules engine 128 evaluates the rules 124 according to the rule parameters 126. This is illustrated in more detail in FIG. 8. When a computed value exceeds a designated threshold, the rules engine 128 raises an alert. In some instances, the alert is sent (140) to a person 130 who will review the aberrant activity. The alert can be an email message, a text message, a pager alert, an instant message, or other type of electronic message. In some implementations, the alert includes a severity level or severity description. In some implementations, the specific alert mechanism used is also indicative of the severity level. In some implementations, the reviewer 130 can either determine that the activity is okay or represents a problem. In some implementations, when the reward card purchase activity is not a problem, the reviewer 130 can modify one or more of the rule parameters 126 so that the rule 124 is less sensitive. In some implementations, the alert is saved to an alert log in in a database 340, and the reviewer 130 updates the status of the alert after the review. In some instances, if the reviewer 130 determines that there is a problem, the reviewer 130 can suspend the corresponding funding account 104 to prevent aberrant activity from continuing. In some implementations, a rule 124 can specify an alert action to suspend the funding account automatically when the specified threshold is exceeded. In this case, during evaluation of the rule 124, the rules engine suspends (142) the funding account immediately.

In addition to alerts that send a message (e.g., an email message or a pager message), some alerts take one or more actions that immediately affect the usage of the corresponding funding account. In some instances, the action taken on the funding account deactivates the funding account so that no additional reward cards can be purchased using the funding account. In some instances, the action taken on the funding account places the funding account in an investigation status. In some implementations, a funding account in investigation status limits the activity on the account. In some instances, the imposed limit on activity precludes any additional purchases of reward cards. In some instances, the imposed limit on activity precludes additional funding transactions as well (i.e., no money can be moved into the funding account). In some implementations, a funding account in investigation status has an upper limit on the number or monetary value of reward cards that can be issued on the funding account. The upper limit may be specified either as an absolute amount (i.e., a limit on the total number or monetary value of reward cards while in investigation status) or as a limit per unit of time (e.g., per hour). In some implementations, the magnitude of the imposed limit depends on the data triggering the alert. For example, when the aggregated data that triggers the alert exceeds the threshold by a large amount, the imposed limit many be small. When the aggregated data exceeds the threshold by a small amount, the imposed limit may be higher. In some implementations, these limits are imposed in real-time, so attempts to issue reward cards that would exceed the limit are prevented.

An alert that triggers investigation status can have other effects as well. For example, in some implementations, an alert can adjust one or more rule parameters for one or more of the rules (e.g., reduce a threshold value). As another example, a funding account in investigation status may require an additional approval (e.g., approval from an additional person) in order to issue new reward cards. In some implementations, when a funding account is in investigation status, the set of authorized users for the funding account may be restricted. In some implementations, when an alert is triggered based on excess reward cards to a specific email address (or domain or group of email addresses), the alert sets up a block on the problematic email address, domain, or group of email addresses.

Although the rules generally identify aberrant activity after it has occurred, implementations can mitigate the exposure in several ways. First, the rules engine 128 has an execution schedule 332 that can be set to run frequently (e.g., every five minutes or every minute). In addition, the rules themselves specify a moving window of time, which can be set appropriately. Some implementations also trigger the rules engine 128 to execute in response to specific transactions (e.g., reward card purchases with large denomination). Some implementations take this one step further to provide real time aberrant activity detection. In these implementations, when a transaction is about to be saved, the relevant rules are executed (which typically involve aggregation of transactions). If an alert is raised, the proposed transaction is either canceled or placed into a pending status.

In order to create and maintain aberrant activity rules 124, the reward card platform 100 provides a rule interface 122. The rule interface is typically used by an administrator 120 who manages reward card accounts for many (or all) customers of the reward card platform 100. In some implementations, the administrator 120 works with the benefactors 108 to determine the appropriate rules. In some implementations, a benefactor 108 can access and update the rules 124 for the benefactor's own funding accounts. Example user interfaces for creating and managing aberrant activity rules are illustrated in FIG. 5 and FIGS. 7A-7D.

Figure 2:
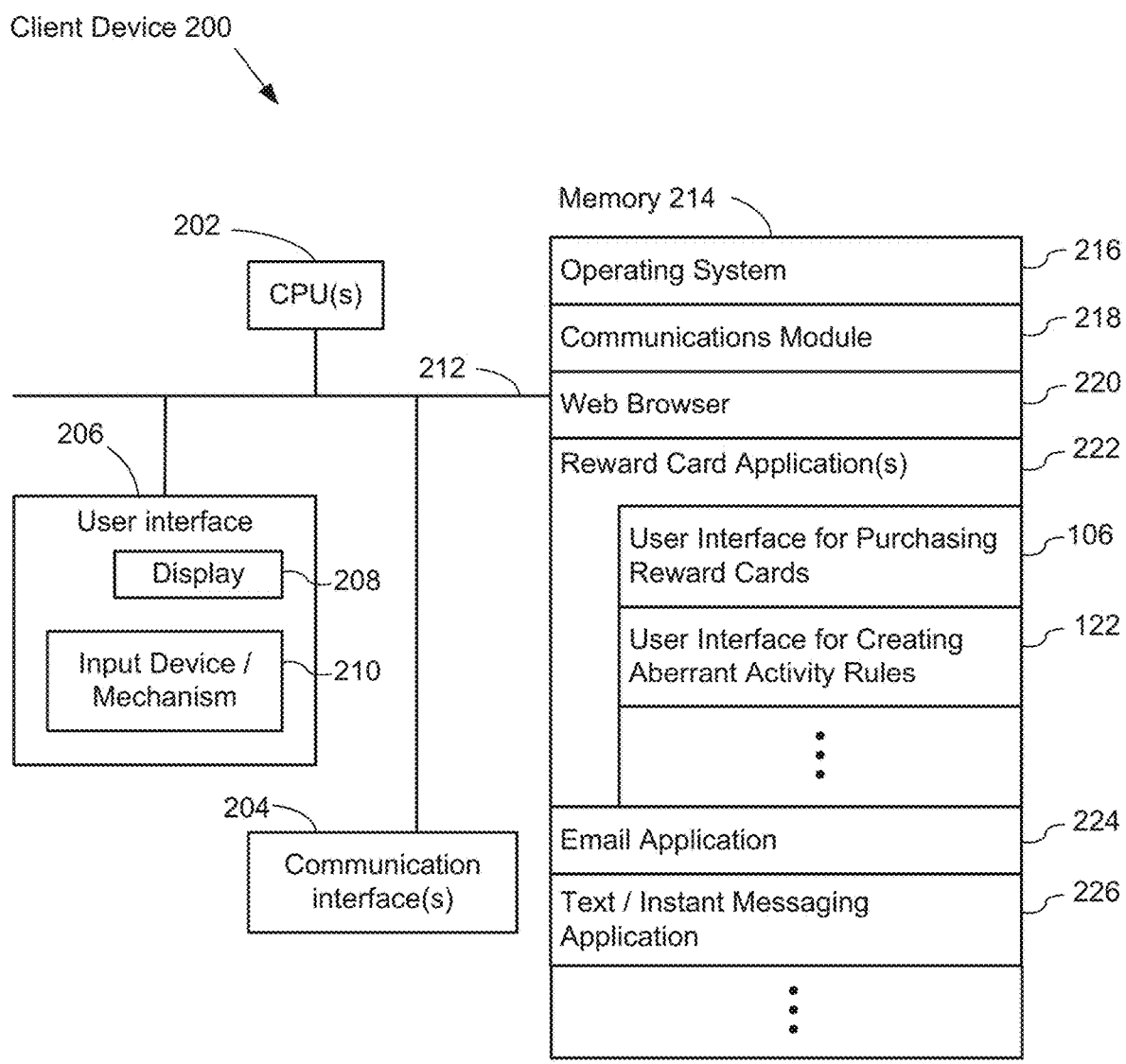
FIG. 2 is a block diagram of a client device according to some implementations.

FIG. 2 is a block diagram illustrating a client device 200 that can display the graphical user interfaces (e.g., 106 and 122) of a reward card platform 100 in accordance with some implementations. A client device is also referred to as a computing device, a user device, or a computer. Various examples of a client device 200 include a desktop computer, a laptop computer, a tablet computer, a hand-held device, a smart mobile phone, and other computing devices that have a display and a processor capable of running a reward card application 222. The client device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The client device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a reward card application 222, which provides one or more graphical user interface 106 and 122. A user, such as a benefactor 108, uses the purchasing user interface 106 in order to purchase reward cards for one or more beneficiaries. This is illustrated with respect to FIG. 4. A user, such as an administrator 120, uses the rules user interface 122 to create and maintain aberrant activity rules. This is illustrated in FIGS. 5 and 7A-7D;
- an email application 224, which enables the user of the client device 200 to receive and send email. In some instances, the user receives email alert messages sent from the rules engine 128; and
- a text or instant messaging application 226, which enables the user to send and receive text messages and/or instant messages. In some instances, the user receives a text message or instant message sent by the rules engine 128.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a client device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
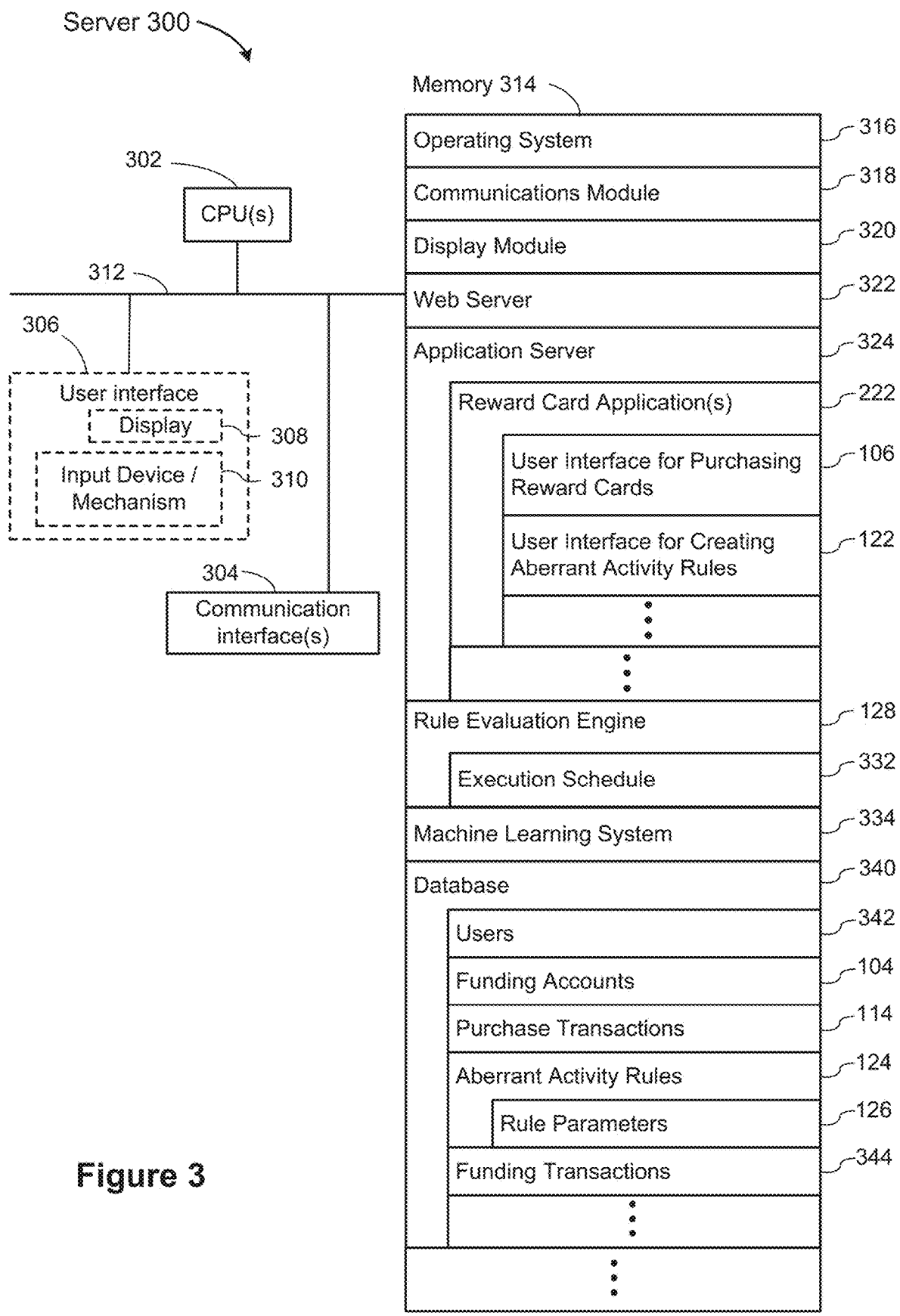
FIG. 3 is a block diagram of a server according to some implementations.

FIG. 3 is a block diagram illustrating a server 300 that may be used in a server system for implementing a reward card platform 100. A typical server system includes many individual servers 300, which may be hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

Figure 8:
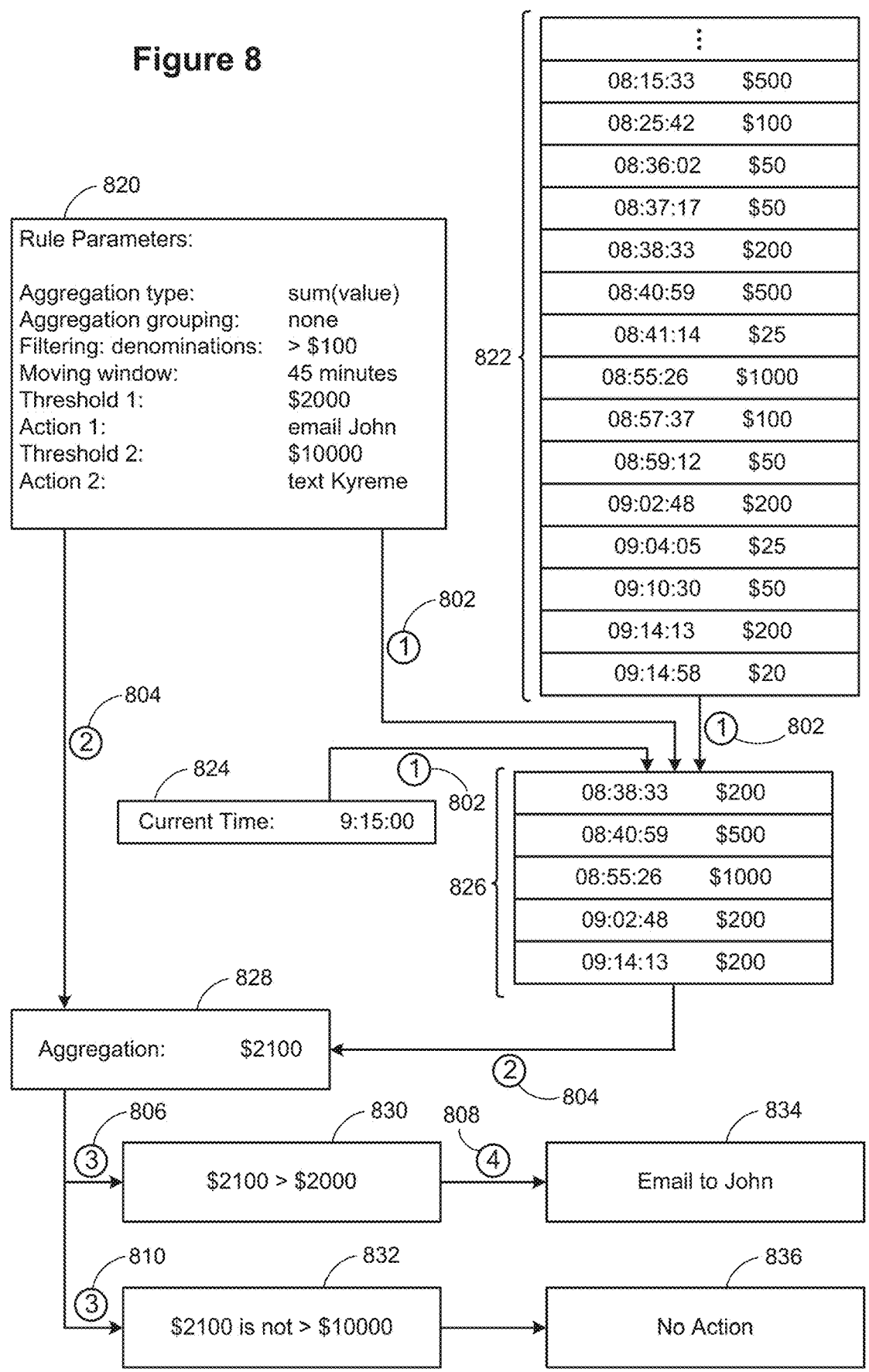
FIG. 8 is a flow diagram illustrating a process of evaluating aberrant activity rules in accordance with some implementations.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless) and one or more communication networks, such as the Internet, other wide area networks, local area networks, metropolitan area networks, and so on;
- a display module 320, which receives input from one or more input devices 310, and generates user interface elements for display on a display device 308;
- one or more web servers 322, which receive requests from a client device 200, and return responsive web pages, resources, or links. In some implementations, each request is logged in the database 340;
- one or more application servers 324, which provide various applications (such as a reward card application 222) to the client devices 200. In some instances, applications are provided as a set of web pages, which are delivered to the client devices 200 and displayed in a web browser 220. The web pages are delivered as needed or requested. In some instances, an application is delivered to a client device 200 as a download, which is installed and run from the client device 200 outside of a web browser 220. In some implementations, the provided reward card application 222 includes a purchasing user interface 106, as illustrated below in FIG. 4. In some implementations, the reward card application 222 includes a rules user interface 122, as illustrated in FIGS. 5 and 7A-7D;

a rule evaluation engine 128, which evaluates each rule 124 according to its rule parameters 126, and when a computed value exceeds the specified threshold, raises an alert of aberrant activity. This is illustrated in FIG. 8. In some implementations, the rule execution engine 128 runs according to an execution schedule 332. The execution schedule may specify a recurrence interval (e.g., every 2 minutes or every five minutes) and/or specify a set of times when the rule engine 128 should run.

a machine learning system 334, which uses historical data on aberrant activity to adjust the rule parameters 126. In some implementations, the machine learning system runs whenever an alert is raised (e.g., based on whether the identified aberrant activity was a problem or not);

one or more databases 340, which store data used by the reward card platform 100. In some implementations, the databases include one or more relational databases (e.g., SQL databases), spreadsheet files, flat (ASCII) file, CSV files, desktop databases, or distributed non-relational database, such as noSQL. The one or more databases 340 include a users table 342, which identifies the set of users who have access to the reward card platform 100 and identifies their access rights (e.g., specific funding accounts). The databases 340 also include a funding account table 104, as described in FIG. 6C. The one or more databases 340 also include a purchase transaction table 114, which tracks the purchases of reward cards. The purchase transaction table 114 is illustrated in FIG. 6A. The databases 340 include one or more rules tables 124, as illustrated in FIG. 6B. In some implementations, the parameters 126 for the rules 124 are stored in a separate parameter table. The databases also store a funding transaction table 344, as illustrated in FIG. 6D.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

FIG. 4 is a simplified example of a user interface 106 for purchasing reward cards in accordance with some implementations. The purchase interface 106 is displayed on a client device 200, such as a smart phone. Based on the user's access privileges, the user has access to a limited number of funding accounts (e.g., one). When the user has access to a single funding account, some implementations default to selecting that one account.

In some implementations, the purchasing interface 106 includes a funding account selection control 402, which enable the user to select among multiple accounts. In addition, the purchasing interface 106 prompts the user to select a brand or other card type. In some instances, a reward card corresponds to a single company (e.g., Amazon®), but in other cases, a reward card can be used for purchases at a variety of merchants. The interface 106 provides a brand selection control 404 to select the brand. The interface also provides a denomination selection control 406 for the user to specify a denomination for the reward card. The interface 106 also enables the user to specify one or more beneficiaries 110 using one or more beneficiary selection controls 408. In some implementations, the user can enter a list of email addresses, separated by commas or semicolons. Some implementations validate the entered email addresses to make sure they have the proper format. In some implementations, the reward card system stores a list of previous beneficiaries and/or potential beneficiaries in the databases 340, which facilitates beneficiary selection.

The purchase interface 106 also includes a cancel control 420 and a submit control 422, enabling the user to cancel or complete the purchase transaction.

In some implementations, the purchase interface validates the data and/or limits the selections based on stored reward card purchase options. For example, the company "Sample Company" may limit reward card purchases to cards with a face value not exceeding $50 and may specify a list of allowed brands. For example, a clothing retailer may not allow purchasing of reward cards for other clothing retailers. Implementations typically validate the available balance in the funding account as well. For example, if the funding account has $400, and the user attempts to purchase twenty $100 reward cards, the purchase will be rejected.

Figure 5:
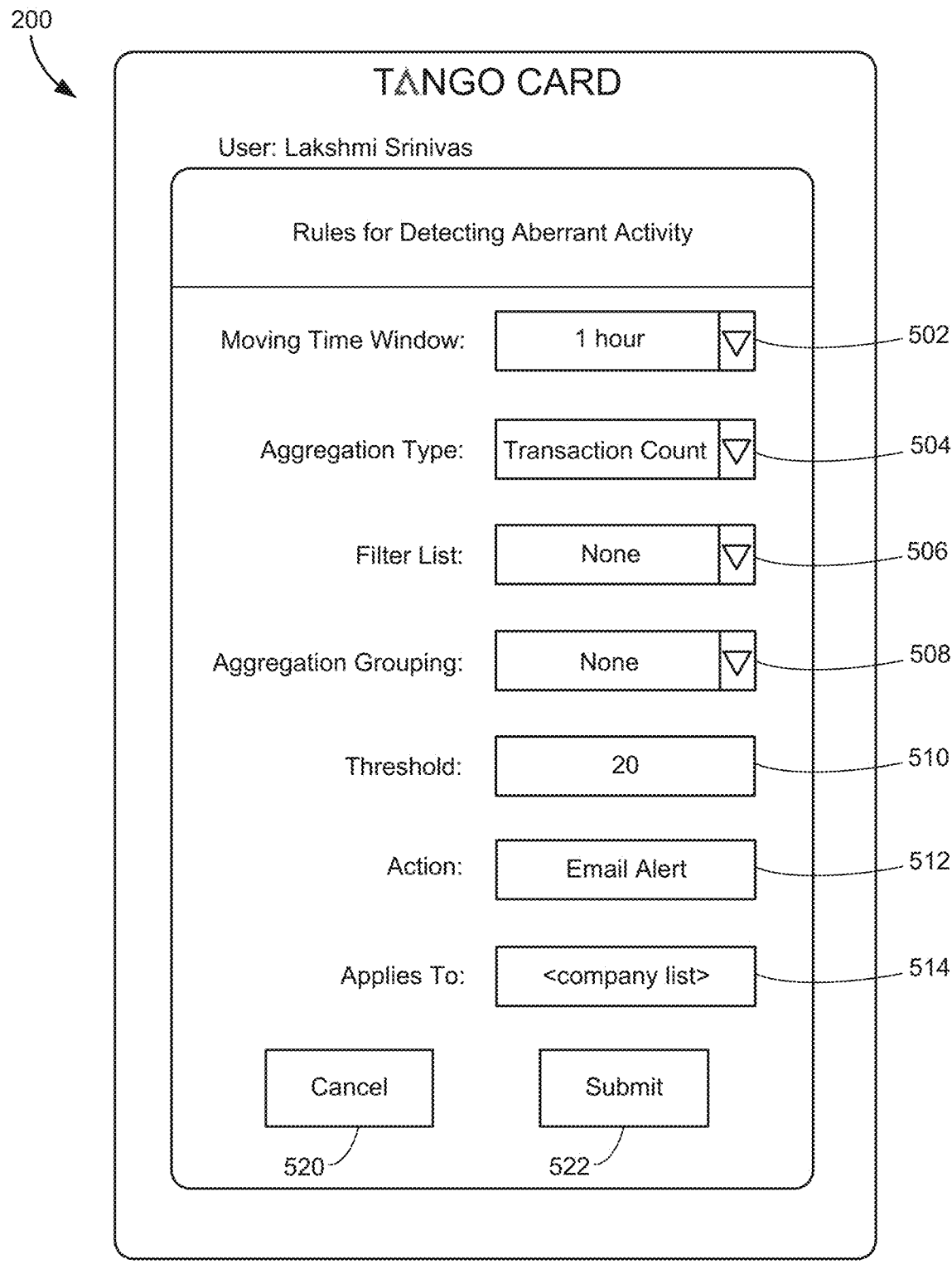
FIG. 5 is a simplified example of a user interface for creating and maintaining aberrant activity rules in accordance with some implementations.

FIG. 5 is a simplified example of a user interface 122 for creating and maintaining aberrant activity rules in accordance with some implementations. Additional user interface screen shots are provided in FIGS. 7A-7D. In general, aberrant activity is identified as too many purchases in a short period of time. The disclosed user interfaces provide many ways to quantify this general idea into specific rules. If the rules are too broad, then too many scenarios will raise false alerts. On the other hand, if the rules are too narrow, then actual instances of fraud may go undetected.

The time window control 502 specifies the duration for the window of time using to aggregate purchase events. For example, if the moving time window is one hour, the rules engine 128 will always look at transactions in the most recent one hour whenever this rule is evaluated. If the same rule is evaluated again two minutes later, the new window will drop off the oldest two minutes from the prior testing and add on the most recent two minutes. That is, there is an overlap of 58 minutes between successive evaluations of the rule. If the rule is evaluated every ten minutes, there is a 50-minute overlap between successive evaluations.

The aggregation type control 504 specifies whether to aggregate a count of transactions or aggregate the face value of the transactions (i.e., as a sum). Some implementations provide other aggregation types as well, such as average or median.

Some implementations provide a filter control 506, which limits the aggregated transactions according to the desired characteristics. For example, the filtering can select certain reward card brands and/or reward card denominations. In some implementations, the user interface 122 allows a user to specify a list of brands to include or exclude. For example, when historical data shows that problems occur more frequently with a couple of specific brands, then a user may create a specific rule that addresses those brands and have a more general rule for all other brands. A user can also filter to specific card denominations. In general, there is greater risk with larger denominations, so there may be specific rules that apply when the denomination is $200 or greater, for example. Although illustrated as a single filter control 506, some implementations provide two or more separate filtering controls depending on what is being filtered. When multiple filter conditions are created for a single rule 124, a transaction must satisfy all of the filter conditions to be included (i.e., the conditions are combined with AND). Some implementations provide for more advanced filtering as well, allowing more complex filter expressions (e.g., arbitrary Boolean expressions).

The aggregation grouping control 508 allows a user to specify how the transactions are grouped together. When no grouping is specified as illustrated by the specific data in FIG. 5, all of the transactions are aggregated together to compute one aggregation value. The grouping can be based on reward card brand, card denominations, and/or beneficiary email address. In each of these cases, a user can specify one or more values that are considered together for grouping. For example, a user can specify grouping by brand, in which case there is a separate aggregation computed for each brand. Instead, the user could specify sets of brands that are considered together. As another example, a user can specify grouping by denomination. By default, this would result in computing a separate aggregation for each denomination. As an alternative, the user could specify denominations <$100 in one set and denominations >=$100 in another set. In this case, when the transactions are retrieved, they are grouped into the two aggregations. When grouping by email address, implementations provide various options. For example, the options in some implementations include exact match, fuzzy match, or domain name.

Some implementations only allow one field for aggregation grouping (e.g., brand, denomination, or email address), but other implementations allow aggregation using two or more of these fields.

When a rule is executed, one or more aggregation values are computed, and compared to a threshold value specified by the threshold control 510. When the aggregation type is a transaction count, then the threshold represents a count, and when the aggregation type is a monetary sum, the threshold value represents a monetary sum. In some implementations, the data is inherently grouped by funding account, but other implementations include this as one of the options aggregation grouping fields. Note that an alert action to suspend a funding account is only available when the data is grouped by funding account.

When a computed aggregation exceeds the specified threshold value, the rules engine 128 takes the action specified in the action control 512. Possible actions include sending a message to a designated email address, phone number, or IP address, sending a pager alert, or suspending a corresponding funding account. In some implementations, the possible actions include blocking of certain IP addresses (e.g., the IP addresses of the devices that initiated the transactions identified as aberrant), shutting down the reward card API or web service, or shutting down purchase transactions for the reward platform 100 entirely.

In some implementations (not illustrated here), a single rule 124 can have multiple thresholds, each with a corresponding action when the threshold is reached.

In some implementations, an aberrant activity rule 124 is created for an individual funding account 104. However, some implementations allow a single rule 124 to apply to multiple funding account or multiple companies. The scope control 514 allows a user to specify a list of companies or funding accounts for the rule. In some implementations, there is a one-to-one correspondence between funding accounts and companies. However, some implementations allow greater flexibility. For example, a single large corporation may have multiple funding accounts designated for different parts of the organization. Conversely, a single company may have multiple legal entities, but they all may use the same funding account.

The rule interface 122 also includes a cancel control 520 and a submit control 522 to save or cancel the user's changes. In some implementations, the various rule parameters specified by the controls in the rules interface 122 are saved to a rule parameters table 126.

FIGS. 6A-6D are skeletal data structures that store data used to identify aberrant activity in accordance with some implementations. FIG. 6A identifies some of the data fields in the transaction table 114, which log transactions that purchase reward cards. The account number field 602 specifies the funding account for the transaction. Each transaction has contact information for the beneficiary, which is typically the beneficiary email address 604. In some implementations, the contact information can include an IP address, phone number, or other unique address, such as the MAC address of a device. Each transaction stores a transaction timestamp 606, which is subsequently used by the rules engine to determine which transactions to select. Each transaction also specifies the denomination 608 or monetary value of the reward card. In general, the denomination 608 is limited to a small set of predetermined values. Each transaction also stores the card brand 610, which is used by some of the rules 124.

FIG. 6B illustrates a skeletal data structure 124 for storing aberrant activity rules. As illustrated in the user interface 122 shown in FIG. 5, each rule 124 specifies a time window duration 622, which is used by the rules engine 128 to select the appropriate set of transactions. Typical durations range from a few minutes to a few hours. The aggregation type 624 specifies how the selected transactions are aggregated. In some implementations, the two types are "transaction count," which just counts the number of transactions, and "face value sum," which adds up the face values of all the reward card purchase transactions. The filters field 626 specifies zero or more filters for the transactions that will be included in the rule.

The aggregation grouping 628 specifies how transactions are grouped together when a rule is evaluated by the rules engine. On one extreme, all of the transactions may be grouped together to form one aggregation. On the other extreme, the grouping can lead to distinct aggregations for each transaction (i.e., no actual aggregation). This can happen, for example, when grouping by email address. Each aggregation is compared to the threshold value stored in the threshold field 630, and when the aggregation exceeds the threshold, the action designated in the action field 632 is initiated.

As described in FIG. 8 below, there can be multiple aggregations and multiple thresholds. Each of the aggregations is typically compared to each of the thresholds, and the appropriate action(s) are taken. In some implementations that allow multiple threshold values for a single aggregation, only the action corresponding to the highest threshold is performed.

The funding account table 104 identifies account numbers 642. In some implementations, the funding account table 104 also enables a user to specify an account name that is meaningful to the user. The funding account table also tracks the current balance 648 in the account. In some implementations, the funding account table 104 includes a status field 646 that identifies the current state of the account. For example, the three rows illustrated in FIG. 6C show statuses of Active, Inactive, and Suspended. In these examples, the "Suspended" status 650 indicates that transactions on the account are currently suspended based on an aberrant activity alert. No additional transactions will be permitted until the problem is resolved. In some implementations, a status of "Inactive" indicates that a user has voluntarily chosen to discontinue activity on an account. Functionally this is essentially the same as "suspended," because both of these status values prevent transactions on the account. In some implementations, the funding account table also includes a company field 644, which specifies the name of the relevant company. Some implementations enforce that an account is associated with a unique company (or "owner," which can be a person). Note, however, that a single company generally may have multiple funding accounts.

Whereas the purchase transaction table 114 tracks money going out of a funding account (into a reward card for a beneficiary), the funding transaction table 344 tracks money that comes into a funding account from an external funding source 102. Each funding transaction includes the account number 662 of the funding account that is receiving the funds, as well as a monetary amount 668 and a timestamp 670 when the transaction occurred. The funding transaction table typically tracks the funding source 664 (e.g., the specific bank or financial institution) as well as the funding type 666 (e.g., the method used to transfer the funds). In some implementations, the funding source field 664 specifies bank routing numbers, such as a nine-digit ABA routing number. In some implementations, the funding types include Wire, ACH, Credit Card, and Check.

In some implementations, the purchase transaction table 114 and the funding transaction table 344 are combined into a single table that tracks all activity for funding accounts.

Figure 7A:
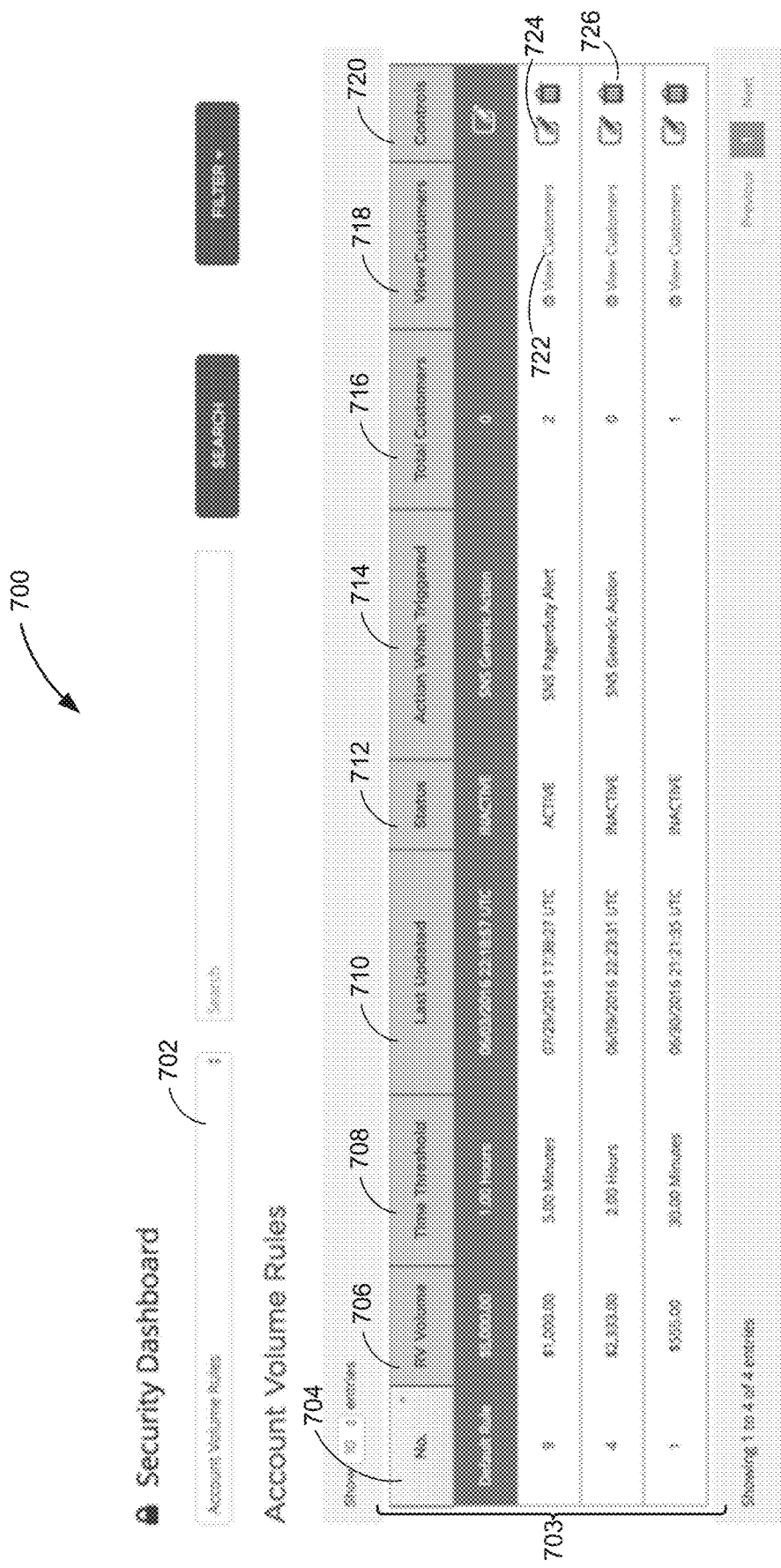
FIGS. 7A-7D are screen shots of user interfaces for creating and maintaining aberrant activity rules for a reward card platform, in accordance with some implementations.
Figure 7B:
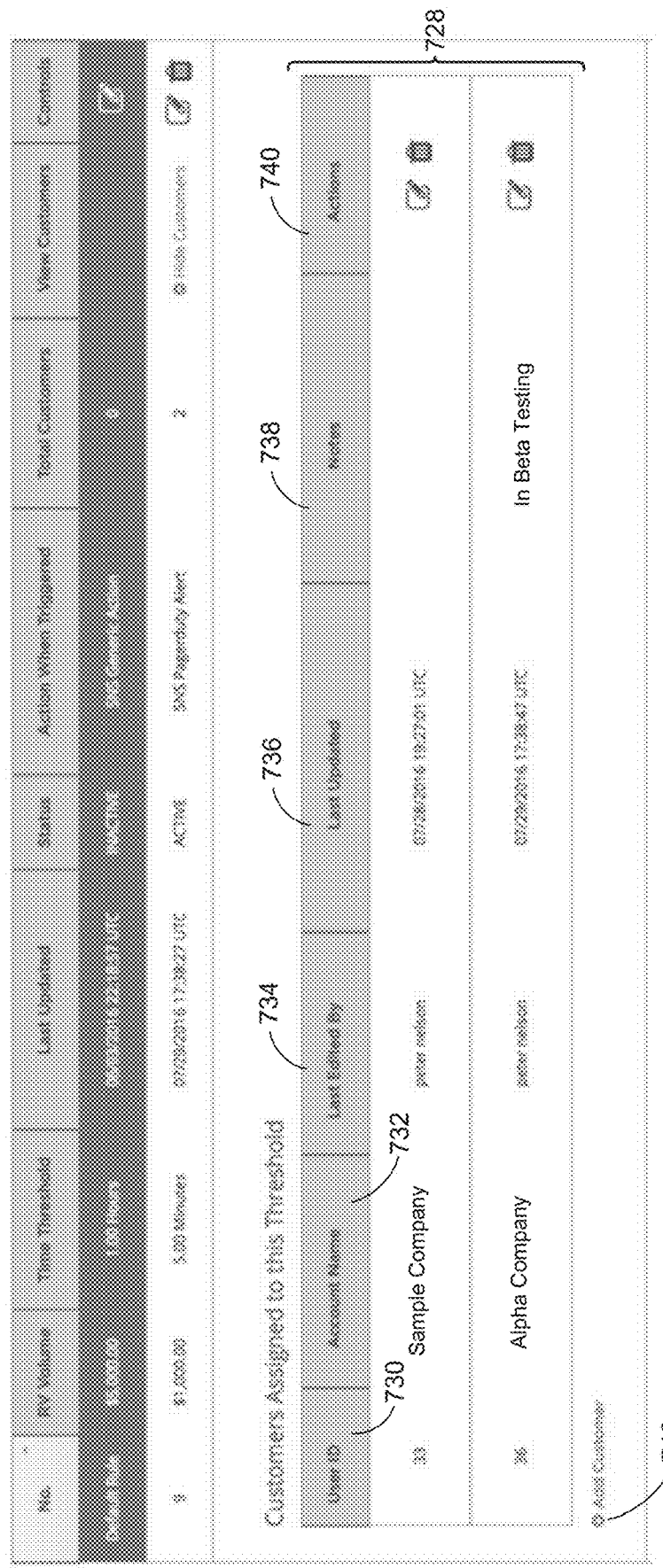
Figure 7C:
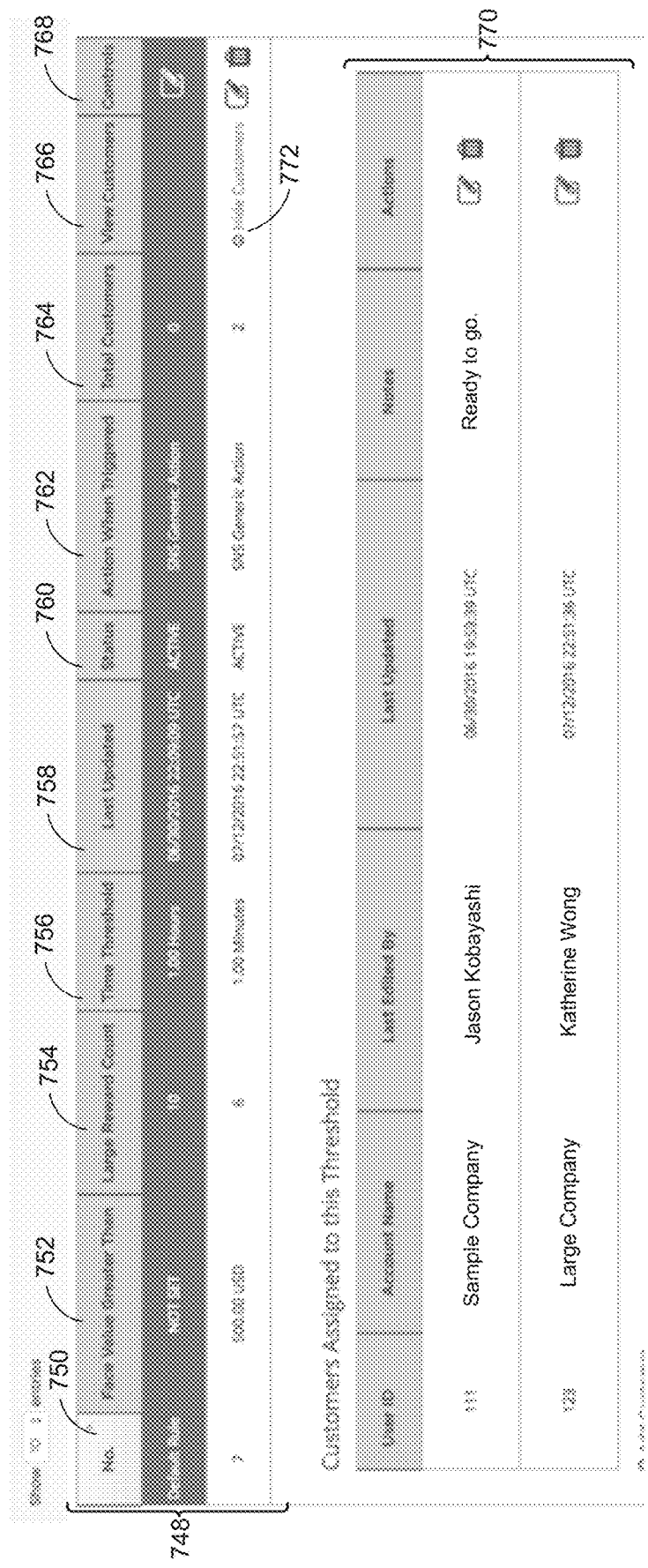
Figure 7D:
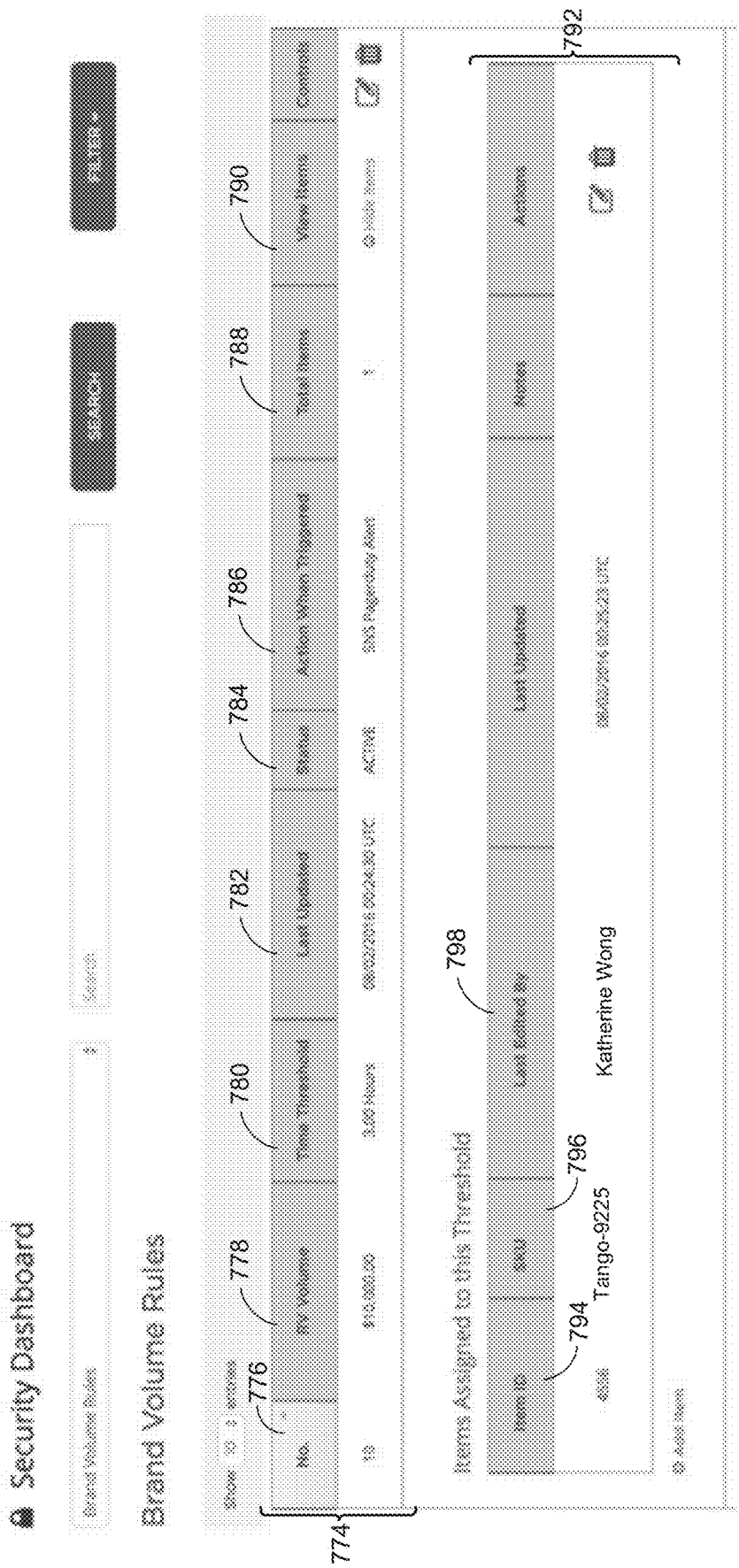

FIGS. 7A-7D are screen shots of user interfaces for creating and maintaining aberrant activity rules for a reward card platform, in accordance with some implementations. In these example screen shots, the reward platform 100 provides several different user interfaces in a "Security Dashboard" 700, with each user interface identifying different types of aberrant activity. These examples split the set of rules 124 into "Account Volume Rules," "Large Reward Rules," and "Brand Volume Rules." As shown in FIGS. 7A and 7D, the Security Dashboard 700 includes a rule type selection control 702, which determines which of the three types are displayed.

FIGS. 7A and 7B Provide screen shots of a user interface for establishing Account Volume Rules. The rule type selection control 702 indicates that a user has selected to review the account volume rules, and the interface displays a grid 703 of saved rules. In this limited example, there are three inactive rules and one active rule, as indicated by the status field 712. Only the active rules will be executed when the rules engine 128 runs.

In some implementations, there is a single default rule, and any number of additional rules, with each rule assigned a unique number, as illustrated by the number field 704. The reward value column 706 specifies the total value of reward card transactions required to trigger the rule's action. The time threshold column 708 specifies the moving window of time used by the rule. In this example, one rule has a window of only five minutes, whereas another rule has a window of two hours. The "last updated" column 710 indicates the last time that a user updated the rule. The action column 714 specifies what action to take when the threshold is exceeded. In this implementation, the "total customers" column 716 indicates how many customers are using a specified rule. In this example, only two customers are currently using the one listed active rule. The "controls" column 720 includes two controls for each of the rules. If a user selects the edit control 724 for a rule, the user interface brings up an edit window (e.g., similar to the rule interface 122 in FIG. 5). The user can delete a rule by selecting the delete control 726.

The "View Customers" column 718 includes a control for each rule to bring up a list of customers assigned to the rule, such as the control 722 for the one active rule. When a user selects the View Customers control 722, the interface brings up a grid 728 of the assigned customers. In some implementations, the grid 728 includes a User Id 730. In some implementations, the user ID 730 is an ID of a user who assigned the rule to the customer. In some implementations, the User Id 730 is an ID of the customer or account. The grid also includes an account name 732. Typically, this is a name of the customer. Some implementations include a "last edited by" column 734 to indicate who last edited a record in this customer grid 728. This implementation also includes a "last updated" timestamp 736, which corresponds to the "last edited by" column 734. The grid also includes a notes column 738 and an "action" column 740. The "Actions" column 740 is similar to the "Controls" column 720 in FIG. 7A, providing controls to edit or delete a row in the grid 728. A user can select the "Add Customer" button 742 to add another customer to the grid 728.

FIG. 7C illustrates a user interface for creating and editing large reward rules. As the name suggests, a large reward rule identifies reward card transactions whose face values exceed a specified value. When the number of large rewards exceeds a specified limit, an alert is triggered. The screen shot in FIG. 7C shows both the grid of rules 748 and the grid of customers 770 assigned to one of the rules. In this example, the customer grid 770 was displayed in response to user selection of a "view customers" control in the "view customers" column 766. Now that the customer grid 770 is displayed, the "view customers" control has been replaced by a "hide customers" control 772. Selection of this control removes the customer grid 770 from the display. Some implementations provide alternative methods of closing the customer grid 770.

The rules grid 748 includes a number column 750, which specifies a unique number for each rule. In some implementations, the value 0 denotes the default rule, and is listed as the default rule in the grid 748. The face value threshold column 752 specifies the upper limit for the denomination of reward cards. Cards with face values higher than the threshold are included in the aggregation. Here, the specified face value acts as a filter on what transactions are selected. The "large reward count" column 754 specifies how many of the large rewards are needed to trigger the alert. Note that if the value is set to one, then a single large reward card would trigger the alert. Whereas an "Account Volume Rule" computes a sum of the card face values, a "Large Reward Rule" counts the number of transactions. The time threshold column 756 specifies the moving window of time, as discussed above.

The "last updated" column 758 indicates the last time a user edited the rule, and the status column 760 indicates what rules are active or inactive. As in FIG. 7A, the action column 762 specifies what action to take when the trigger fires. The "total customers" column 764 is a computed field that indicates the number of customers assigned to this rule. As in FIG. 7A, the "view customers" column 766 provides controls for bringing up lists of customers assigned to each rule and the controls column 768 includes controls for each rule to edit or delete the rule.

FIG. 7D provides a user interface for creating and maintaining volume rules for specific reward card brands. This screen shot shows both the brand volume rules grid 774 and an item grid 792 that lists the items included in the listed rule. Here, the item grid 792 was displayed in response to user selection of a "View Items" control in the "View Items" column 790. Each brand rule has a rule number specified in the Rule Number column 776, and a rule status specified in the status column 784. In this case, the one visible rule in the rule grid 774 is active. The Rewards Value Volume column 778 specifies the total monetary value that triggers an alert, and the "Time Threshold" 780 specifies the moving window of time. In this example, the alert is triggered when the total monetary value exceeds $10,000 in a three-hour period. Some implementations include a "Last Updated" column 782 to specify the time of the last change to each rule. The action column 786 specifies what action to take if the threshold is exceeded. The "Total Items" column 788 is a computed field that indicates how many different brands are included in the rule. In this case, there is only one brand in the list.

The "items" in the item grid 792 are the brands to include in the brand rule. In some implementations, the item grid includes an item ID 794, which is a unique identifier of the item. The item is also identified by an SKU ("stock keeping unit") 796. Each different brand has a uniquely assigned SKU. Note that this is a SKU for the reward cards themselves, not a SKU for products that a beneficiary later buys with a reward card. In some implementations, the item grid also includes a column for a brand name (e.g., Starbucks®). Some implementations also include a "Last Edited By" column 798, as well as a column that specifies the time of the last edit, a column for notes, and a column that has control to edit or delete the item.

As noted above, the aberrant activity rules are typically applied per funding account. However, for brand volume rules (as illustrated in FIG. 7C above), some implementations allow the rules to be applied across funding accounts, thereby looking for aberrant activity on the platform as a whole. In this case, some implementations normalize the data in some way to account for the fact that total count and total monetary amount depends on the number of customers using the reward platform 100. For example, some implementations normalize the calculation by dividing by the total number of transactions during the specified window, or the average total number of transactions during a specified period of time (e.g., one day or one week).

FIG. 8 is a flow diagram illustrating a process of evaluating aberrant activity rules in accordance with some implementations. In this example, a specific rule has been selected, and the rules engine 128 runs at 9:15 AM (824). The rule parameters 126 for the selected rule are summarized in the upper left box 820. The transaction table 114 has many transactions, including the list 822. The first step 802 is to identify the transactions that fall within the moving window and satisfy the filter conditions. Because the moving window extends back 45 minutes from the current time 824, the window is 8:30-9:15. The only filter condition is to include only transactions whose denominations are greater than $100. Based on the window and the filter, there are only five transactions to include, as shown in the second list 826.

The second step is to use the selected transactions 826 and apply the specified aggregation grouping and aggregation type as specified by the rule parameters. Here, there is no specified grouping, so only one aggregation value is computed, and it is computed based on all of the selected transactions 826. The aggregation type is monetary value, so the aggregation 828 is the sum of the dollar values of the selected transactions 826. That is, the aggregation is $2100.

Next, the aggregation value 828 is compared (806) and (810) to each of the threshold values. When the aggregation value 828 is compared (806) to the first threshold, it is determined that the aggregation value exceeds (830) the threshold. Therefore, the corresponding alert is triggered (808), which sends (834) an email message to John. On the other hand, when the aggregation value 828 is compared (810) to the second threshold value, it is determined that the aggregation value does not exceed (832) the second threshold value. Therefore, no corresponding action occurs (836). In some implementations, when there are multiple thresholds, only the action corresponding to the highest threshold exceeded is actually triggered. For example, if the second threshold were exceeded here, only the second action would be triggered rather than both actions.

Although the rules execution engine conceptually uses the same database table 114 that is used during the purchase of reward cards, having the rules engine operate on the same physical database can lead to performance bottlenecks. Therefore, some implementations utilize an ETL engine to extract the data from the transaction table 114 (just the relevant columns) and store the data in a data warehouse or OLAP database. In some implementations, the extraction and transfer of the data is done in real-time or nearly real-time so that the rules engine 128 has current data to query. In some implementations, the rules engine runs in nearly real-time as well, such as every five seconds, so when aberrant activity is detected, solutions can be applied quickly.

Example #1

The techniques disclosed herein can detect an unusual usage pattern on an account, such as the purchase of three $500 gift cards in quick succession.

Example #2

Some implementations also detect individual transactions that are highly unusual, such as the purchase of a large reward card for a coffee shop.

Example #3

Some implementations also detect possible fraud based on recipient email address. For example, odd email addresses, long email addresses, email addresses with too many odd characters, or domain names that have previously been associated with higher fraud.

Example #4

As noted above, aggregation grouping can use beneficiary email address, which results in a separate aggregation for each distinct email address. Too many reward cards with the same recipient email address (or nearly the same email address) should be rare. For example, a rule can be set up to aggregate by email address, use a count aggregation type, and trigger an alert when the count is greater than two within a 24-hour period. In some implementations, grouping by email address can apply a similarity function to group email addresses that are nearly the same.

Although the disclosed techniques apply primarily to the purchase of reward cards, techniques can also be applied to identify aberrant activity in the funding of accounts. In this case, the rules engine looks at the funding transactions 344. Rules can recognize aberrant activity based on the source of the funds, how much money is in the account compared to historical information, and whether an account is funded from multiple sources (which is unusual).

The techniques described can be expanded in various ways depending on what data is stored for each transaction. For example, some implementations store an IP address for the device used by the benefactor initiating the purchase transaction and/or the IP address of the beneficiary. Some implementations utilize these IP address (or portions thereof) to identify aberrant activity. Additional data fields that are tracked in the transaction table 114 can be used for filtering or aggregating.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer system implementing a reward card platform, the computer system having a display, one or more processors, and memory storing one or more programs configured for execution by the one or more processors, and the computer system comprising:

a machine learning system that uses historical data on aberrant activity and input from users regarding aberrant activity to periodically retrain a machine learning model for the aberrant activity rules using calculated aggregations for the aberrant activity rules, threshold values for the aberrant activity rules, and user feedback on aberrant activity alerts for the aberrant activity rules, wherein the retraining updates a first rule of the aberrant activity rules to modify one or more of: (i) a duration for a moving time window for the first rule, (ii) an aggregation type for the first rule, and (iii) a threshold value for the first rule; and a rules execution engine that runs periodically to evaluate each of the aberrant activity rules, including the first rule, using stored reward card purchase transactions, including, for each aberrant activity rule:
  determining a respective moving time window relative to a current time of the evaluation;
  identifying stored reward card purchase transactions whose timestamps fall within the respective moving time window and whose reward card brand and/or reward card denomination match filtering specified for the respective aberrant activity rule;
  computing a respective aggregation of the identified reward card purchase transactions according to a respective aggregation type and a respective aggregation grouping for the respective aberrant activity rule; and
  upon determining that the respective aggregation, computed by the rules execution engine, exceeds the respective specified threshold value, transmitting an electronic message indicating detection of aberrant activity.

2. The computer system of claim 1, further comprising a database that stores, for each reward card purchase transaction:
  (i) a funding account;
  (ii) a beneficiary email address;
  (iii) a timestamp indicating a time when the transaction occurred;
  (iv) a reward card denomination; and
  (v) a reward card brand.

3. The computer system of claim 1, wherein a first aberrant activity rule includes a plurality of threshold values, each threshold value having a corresponding distinct aberrant activity alert; and
  wherein evaluating the first aberrant activity rule further comprises:
    comparing the respective aggregation to each of the plurality of threshold values; and
    upon determining that the respective aggregation exceeds a respective one of the threshold values, transmitting an electronic message indicating detection of aberrant activity.

4. The computer system of claim 1, wherein the rules execution engine computes a plurality of aggregations according to the respective aggregation grouping, and each of the plurality of aggregations is independently compared to the respective threshold value.

5. The computer system of claim 1, wherein the respective aggregation grouping is based on one or more of: reward card brand, reward card denomination, and beneficiary email address.

6. The computer system of claim 1, further comprising after transmitting an electronic message indicating detection of aberrant activity based on a first aberrant activity rule:

receiving user input in a third user interface indicating the reward card transactions associated with the aberrant activity detection are not a problem; and in response to receiving the user input that the reward card transactions associated with the aberrant activity detection are not a problem, automatically adjusting the threshold value corresponding to the first aberrant activity rule.

7. The computer system of claim 1, wherein the reward card is a gift card.

8. The computer system of claim 1, wherein:

upon determination that a calculated aggregation of identified reward card purchase transactions for a rule exceeds the specified threshold value for the rule, the rules execution engine imposes a limit on number or monetary value of reward cards that can be issued on the funding account; and the limit is determined in accordance with the calculated aggregation and the specified threshold value.

9. A non-transitory computer readable storage medium storing one or more programs configured for execution by a computer system having one or more processors, memory, and a display, the one or more programs comprising instructions for:

a machine learning system that uses historical data on aberrant activity and input from users regarding aberrant activity to periodically retrain a machine learning model for the aberrant activity rules using calculated aggregations for the aberrant activity rules, threshold values for the aberrant activity rules, and user feedback on aberrant activity alerts for the aberrant activity rules, wherein the retraining updates a first rule of the aberrant activity rules to modify one or more of: (i) a duration for a moving time window for the first rule, (ii) an aggregation type for the first rule, and (iii) a threshold value for the first rule; and a rules execution engine that runs periodically to evaluate each of the aberrant activity rules, including the first rule, using reward card purchase transactions stored in a database, including, for each aberrant activity rule:

determining a respective moving time window relative to a current time of evaluation;

identifying stored reward card purchase transactions whose timestamps fall within the respective moving time window and whose reward card brand and/or reward card denomination match the specified filtering for the respective aberrant activity rule;

computing a respective aggregation of the identified reward card purchase transactions according to a respective aggregation type and a respective specified aggregation grouping for the respective aberrant activity rule; and upon determining that the respective aggregation, computed by the rules execution engine, exceeds the respective threshold value, transmitting an electronic message indicating detection of aberrant activity.

10. The computer readable storage medium of claim 9, wherein the database stores, for each reward card purchase transaction:

(i) a funding account;
(ii) a beneficiary email address;
(iii) a timestamp indicating a time when the transaction occurred;
(iv) a reward card denomination; and
(v) a reward card brand.

11. The computer readable storage medium of claim 9, wherein a first aberrant activity rule includes a plurality of threshold values, each threshold value having a corresponding distinct aberrant activity alert; and wherein evaluating the first aberrant activity rule further comprises:

comparing the respective aggregation to each of the plurality of threshold values; and upon determining that the respective aggregation exceeds a respective one of the threshold values, transmitting an electronic message indicating detection of aberrant activity.

12. The computer readable storage medium of claim 9, wherein the rules execution engine computes a plurality of aggregations according to the respective aggregation grouping, and each of the plurality of aggregations is independently compared to the respective threshold value.

13. The computer readable storage medium of claim 9, wherein the respective aggregation grouping is based on one or more of: reward card brand, reward card denomination, and beneficiary email address.

14. The computer readable storage medium of claim 9, wherein the one or more programs further comprise instructions for, after transmitting an electronic message indicating detection of aberrant activity based on a first aberrant activity rule:

receiving user input in a third user interface indicating the reward card transactions associated with the aberrant activity detection are not a problem; and in response to receiving the user input that the reward card transactions associated with the aberrant activity detection are not a problem, automatically adjusting the threshold value corresponding to the first aberrant activity rule.

15. A method for detecting aberrant activity on a reward card platform, comprising:

at a computer system having one or more processors, memory, and a display:

using historical data on aberrant activity and input from users regarding aberrant activity to periodically retrain a machine learning model for the aberrant activity rules using calculated aggregations for the aberrant activity rules, threshold values for the aberrant activity rules, and user feedback on aberrant activity alerts for the aberrant activity rules, wherein the retraining updates a first rule of the aberrant activity rules to modify one or more of: (i) a duration for a moving time window for the first rule, (ii) an aggregation type for the first rule, and (iii) a threshold value for the first rule; and periodically evaluating each of the aberrant activity rules, including the first rule, using reward card purchase transactions stored in a database, including, for each aberrant activity rule:

determining a respective moving time window relative to a current time of evaluation;

identifying stored reward card purchase transactions whose timestamps fall within the respective moving time window and whose reward card brand and/or reward card denomination match the specified filtering for the respective aberrant activity rule;

computing a respective aggregation of the identified reward card purchase transactions according to a respective aggregation type and a respective specified aggregation grouping for the respective aberrant activity rule; and upon determining that the respective aggregation, computed by the rules execution engine, exceeds the respective threshold value, transmitting an electronic message indicating detection of aberrant activity.

16. The method of claim 15, wherein the database stores, for each reward card purchase transaction:
(i) a funding account;
(ii) a beneficiary email address;
(iii) a timestamp indicating a time when the transaction occurred;
(iv) a reward card denomination; and
(v) a reward card brand.

17. The method of claim 15, wherein a first aberrant activity rule includes a plurality of threshold values, each threshold value having a corresponding distinct aberrant activity alert; and
wherein evaluating the first aberrant activity rule further comprises:
comparing the respective aggregation to each of the plurality of threshold values; and
upon determining that the respective aggregation exceeds a respective one of the threshold values, transmitting an electronic message indicating detection of aberrant activity.

18. The method of claim 15, wherein a plurality of aggregations is computed according to the respective aggregation grouping, and each of the plurality of aggregations is independently compared to the respective threshold value.

19. The method of claim 15, wherein the respective aggregation grouping is based on one or more of: reward card brand, reward card denomination, and beneficiary email address.

20. The method of claim 15, further comprising after transmitting an electronic message indicating detection of aberrant activity based on a first aberrant activity rule:
receiving user input in a third user interface indicating the reward card transactions associated with the aberrant activity detection are not a problem; and
in response to receiving the user input that the reward card transactions associated with the aberrant activity detection are not a problem, automatically adjusting the threshold value corresponding to the first aberrant activity rule.

* * * * *